(12) United States Patent
Enyedy et al.

(10) Patent No.: US 9,579,743 B2
(45) Date of Patent: Feb. 28, 2017

(54) COAXIAL WELDING CABLE ASSEMBLY

(75) Inventors: Edward A. Enyedy, Eastlake, OH (US); Larry Boehnlein, Chardon, OH (US); Chris Hamilton, Euclid, OH (US)

(73) Assignee: Lincoln Global, Inc., City of Industry, CA (US)

( * ) Notice: Subject to any disclaimer, the term of this patent is extended or adjusted under 35 U.S.C. 154(b) by 2355 days.

(21) Appl. No.: 11/456,904

(22) Filed: Jul. 12, 2006

(65) Prior Publication Data

US 2008/0011730 A1    Jan. 17, 2008

(51) Int. Cl.
    *B23K 9/32*    (2006.01)

(52) U.S. Cl.
    CPC .................... *B23K 9/323* (2013.01)

(58) Field of Classification Search
    CPC ................................. B23K 9/32; B23K 9/323
    USPC .................. 219/137.9, 137.2, 136; 174/15.7
    See application file for complete search history.

(56) References Cited

U.S. PATENT DOCUMENTS

| | | | | |
|---|---|---|---|---|
| 2,320,470 A | * | 6/1943 | Rees | 174/15.7 |
| 3,127,467 A | * | 3/1964 | Toto | 174/15.7 |
| 3,163,704 A | * | 12/1964 | Leathers | 174/15.7 |
| 3,815,054 A | * | 6/1974 | McClure et al. | 333/5 |
| 3,992,565 A | * | 11/1976 | Gatfield | 174/15.7 |
| 4,198,111 A | | 4/1980 | Cappel | |
| 4,199,653 A | * | 4/1980 | Talley | 174/15.7 |
| 4,310,718 A | * | 1/1982 | Eng | 174/15.7 |
| 4,864,107 A | * | 9/1989 | Boyal | 219/549 |
| 5,262,609 A | | 11/1993 | Nowak et al. | |
| 5,558,794 A | * | 9/1996 | Jansens | 219/549 |
| 5,874,709 A | * | 2/1999 | New et al. | 219/137.9 |
| 6,066,832 A | * | 5/2000 | Uecker et al. | 219/136 |
| 2005/0014410 A1 | | 1/2005 | Justice | |
| 2006/0138113 A1 | * | 6/2006 | Ott | 219/132 |

* cited by examiner

*Primary Examiner* — Dana Ross
*Assistant Examiner* — Ayub Maye
(74) *Attorney, Agent, or Firm* — Hahn Loeser & Parks LLP (57) ABSTRACT

A lighter weight, more flexible coaxial welding cable assembly, and a system and method for constructing same. An embodiment of the coaxial welding cable assembly comprises a central electrical conductor length having a first cross-sectional area and a first insulating jacket surrounding the central electrical conductor length. The coaxial welding cable assembly also includes a plurality of peripheral electrical conductor lengths surrounding the insulated central electrical conductor length, where a total cross-sectional area of the plurality of peripheral electrical conductor lengths is approximately the same as the first cross-sectional area of the central electrical conductor length. The central electrical conductor length is electrically insulated from the plurality of peripheral electrical conductor lengths only by the first electrically insulating jacket. A second electrically insulating jacket surrounds the plurality of peripheral electrical conductor lengths to contain the insulated central electrical conductor length and the plurality of peripheral electrical conductor lengths.

18 Claims, 6 Drawing Sheets

COAXIAL WELDING CABLE ASSEMBLY

TECHNICAL FIELD

Certain embodiments of the present invention relate to cable assemblies. More particularly, certain embodiments of the present invention relate to coaxial welding cable assemblies and systems and methods for producing the same.

BACKGROUND OF THE INVENTION

There are many types of welding systems used for a variety of applications. Typical prior art welding systems include a power supply, such as phase control, inverter and converter based power supplies, and a controller that controls the output of the power supply. Welding systems reside at the core of the modern industrial age. From massive automated automobile assembly operations to manual, portable environments, these systems facilitate joining in ever more complicated manufacturing operations.

One such example of a welding system includes an electric arc welding system. Such a system may involve movement of a consumable electrode, for example, toward a work-piece while current is passed through the electrode and across an arc developed between the electrode and the work-piece. The electrode may be a non-consumable or consumable type, wherein portions of the electrode may be melted and deposited on the work-piece.

In certain arc welding applications, a supply of welding wire is typically pulled from a drum by a wire feeder and pushed through a welding cable and then through a welding gun which is movable along a work-piece. The welding gun typically includes a tubular contact tip allowing a welding current to be conducted to the wire moving through a wire receiving passage in the contact tip so the current between the wire and work-piece melts the wire for deposition of the metal onto the work-piece.

In electric arc welding technology, a power source passes a current between an electrode and a work-piece. Often, the electrode is a continuous welding wire drawn from a supply of welding wire, such as a drum or reel, and passed through a contact tip on its way to being melted and deposited onto the work-piece. In such a welding procedure, the power source of the welder includes a first stud connected to the electrode, usually through the contact tip, and a second stud connected to the work-piece. Connections are by welding cables, which cables may be quite long and include a variety of impedance variables, such as inductive reactance based upon length, position, and shape of the cables.

When performing a welding process, the power supply receives a current command to create a particular pulse wave between the electrode and work-piece. Such a welder must accurately control the pulse shape or waveform by controlling the voltage to a pulse width modulator operated at a frequency typically exceeding about 20 Khz. To assure the desired welding operation constituting specific waveforms between the electrode and work-piece, the command signal is created based upon a feedback from the actual welding operation. The feedback typically involves the arc current and/or arc voltage.

To control the welding process, welding power sources that provide waveform control have been developed. These power sources deliver a series of selectively shaped electrical power waveforms to the weld. The power waveform is optimized for a selected arc welding process, weld metal, wire feed speed, and weld joint.

Prior art controllers use a number of feedback parameters, including output current and output voltage. When output voltage is the feedback parameter, it is known in the prior art to feedback either power supply voltage or voltage from sense leads connected to the work-piece or bench, and the wire feed motor. Power supply voltage, as used herein, includes output voltage in or near the power supply, such as on the output studs. Voltage sense lead, as used herein, includes one or more leads used to sense output voltage remotely from the power supply, such as at the work-piece and/or the wire feeder.

The power supply voltage may differ from a sense lead voltage because of losses in the welding cable. Often, the power supply voltage is sufficient to control the power supply. Other times a more accurate voltage feedback is desired, and sense leads are used.

Sense leads typically connect to a specially designated sensor on the welding power supply. The negative voltage sense lead is typically clamped or clipped onto the work-piece or workbench, and the positive voltage sense lead is typically connected to the wire feed motor. The sense leads often lay on the ground between the welding power supply and the work-piece. Certain non-commercial prior art welding systems use a separate arc voltage sense wire that is clipped to a point near the welding electrode to more accurately measure arc voltage. Prior art commercial systems use a similar work-piece sense lead which is clipped to the work-piece.

Typically, to assure an accurate feedback of arc voltage, it is common practice to use remote voltage sensing leads directed from the controller of the power source to the electrode or contact tip and the work-piece. The voltage of these leads determines the command signal to the power source from the controller.

Figure 1:
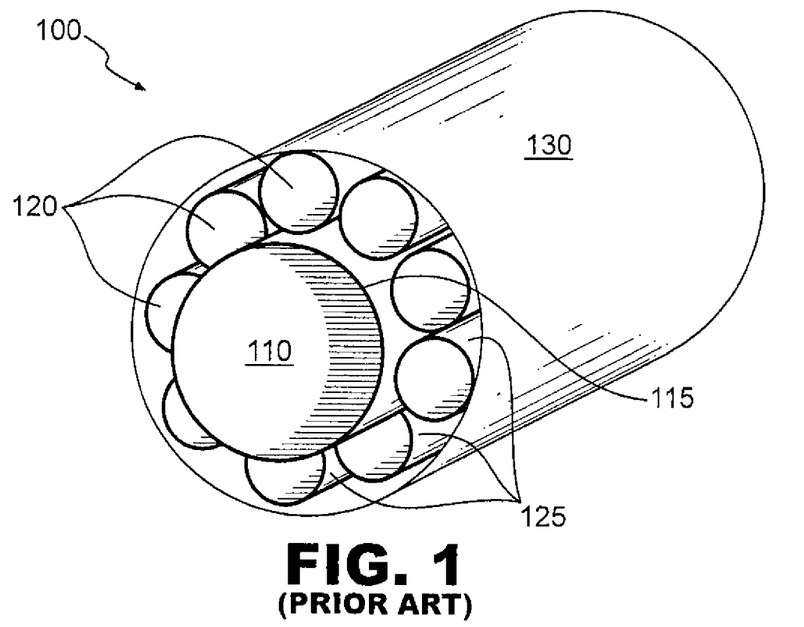
FIG. 1 is an exemplary illustration of a cross-sectional view of a coaxial welding cable assembly, in accordance with the prior art.

FIG. 1 is an exemplary illustration of a cross-sectional view of a coaxial welding cable assembly 100, in accordance with the prior art. Such a coaxial welding cable may be connected between a power source of a welding system and an electrode (or wirefeeder) and work-piece as described above.

The cable assembly 100 includes a central electrical conductor 110 having an outer, electrically insulating layer 115. Positioned around the insulated central conductor 110, 115 is a plurality of peripheral electrical conductors 120, each having an outer electrically insulating layer 125. The entire assembly is then wrapped in an electrically insulating jacket 130. Such a cable assembly, as constructed for welding applications, is typically heavy and stiff because of the multiple conductors and associated multiple layers of insulating material.

Therefore, there remains a need in the art for reducing the weight and increasing the flexibility of such coaxial welding cables.

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY OF THE INVENTION

A first embodiment of the present invention comprises a coaxial cable assembly. The cable assembly includes a central electrical conductor length having a first cross-sectional area and a first electrically insulating jacket surrounding the central electrical conductor length. The cable assembly also includes a plurality of peripheral electrical conductor lengths surrounding the insulated central electrical conductor length, wherein the central electrical conductor length is electrically insulated from the plurality of peripheral electrical conductor lengths only by the first electrically insulating jacket, and wherein a total cross-sectional area of the plurality of peripheral electrical conductor lengths is approximately the same as the first cross-sectional area of the central electrical conductor length. The cable assembly further includes a second electrically insulating jacket surrounding the plurality of peripheral electrical conductor lengths to contain the insulated central electrical conductor length and the plurality of peripheral electrical conductor lengths.

A second embodiment of the present invention comprises a coaxial cable assembly. The cable assembly includes a central electrical conductor length having a first cross-sectional area. The cable assembly also includes a plurality of peripheral electrical conductor lengths surrounding the central conductor length, wherein a total cross-sectional area of the plurality of peripheral electrical conductor lengths is approximately the same as the first cross-sectional area of the central electrical conductor length. The cable assembly further includes a plurality of first electrically insulating jackets, wherein each of the plurality of peripheral electrical conductor lengths is surrounded by one of the plurality of first electrically insulating jackets, and wherein the central electrical conductor length is electrically insulated from the plurality of peripheral electrical conductor lengths only by the plurality of first electrically insulating jackets. The cable assembly also includes a second electrically insulating jacket surrounding the plurality of insulated peripheral electrical conductor lengths to contain the central electrical conductor length and the plurality of insulated peripheral electrical conductor lengths.

Another embodiment of the present invention comprises a system for constructing a coaxial cable assembly. The system includes a means for wrapping a plurality of electrically un-insulated peripheral electrical conductor lengths around an electrically insulated central electrical conductor length, wherein a total cross-sectional area of the plurality of peripheral electrical conductor lengths is approximately the same as a cross-sectional area of the central electrical conductor length. The system also includes a means for applying an electrically insulating jacket around the plurality of peripheral electrical conductor lengths to contain the peripheral electrical conductor lengths and the electrically insulated central electrical conductor length.

A further embodiment of the present invention comprises a system for constructing a coaxial cable assembly. The system includes a means for wrapping a plurality of electrically insulated peripheral electrical conductor lengths around an electrically un-insulated central electrical conductor length, wherein a total cross-sectional area of the plurality of peripheral electrical conductor lengths is approximately the same as a cross-sectional area of the central electrical conductor length. The system also includes a means for applying an electrically insulating jacket around the plurality of peripheral electrical conductor lengths to contain the peripheral conductor lengths and the electrically un-insulated central electrical conductor length.

These and other advantages and novel features of the present invention, as well as details of illustrated embodiments thereof, will be more fully understood from the following description and drawings.

DETAILED DESCRIPTION OF THE INVENTION

Figure 2:
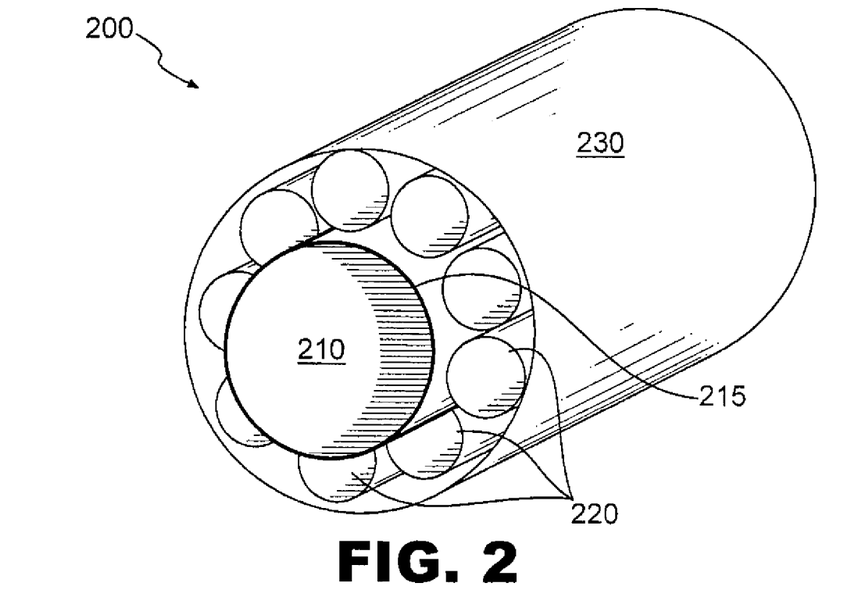
FIG. 2 is an exemplary illustration of a first embodiment of a coaxial welding cable assembly, in accordance with various aspects of the present invention.

FIG. 2 is an exemplary illustration of a first embodiment of a coaxial welding cable assembly 200, in accordance with various aspects of the present invention. Coaxial weld cables exhibit substantially less inductance per unit length than traditional welding cables. A low inductance cable allows the passage of dynamic current waveforms with minimal distortion. The cable assembly 200 has a central electrical conductor 210, having a first pre-defined cross-sectional area which is relatively uniform, running the length of the cable assembly 200. In accordance with an embodiment of the present invention, the central electrical conductor 210 is substantially cylindrical in shape, having a substantially circular cross-sectional area. As an example, the cross-sectional area of the central electrical conductor 210 may be approximately 0.2 square inches (when the diameter is about 0.5 inches). The central electrical conductor may be made of any number of different types of conductive electrical materials such as, for example, copper. Alternatively, the cross-section of the central electrical conductor 210 may be in the form of other shapes as well such as, for example, a rectangular shape.

The cable assembly 200 also has a first electrically insulating jacket 215 surrounding the central electrical conductor 210. The insulating jacket 215 covers the outer surface of the central electrical conductor 210 along the length of the central electrical conductor 210. In accordance with an embodiment of the present invention, the insulating jacket 215 may be applied to the central electrical conductor 210 such that the insulating jacket 215 adheres to the central electrical conductor 210. For example, the insulating jacket 215 may be a coating that is applied to the central electrical conductor 210. Alternatively, the insulating jacket 215 may be a sleeve that slides over the central electrical conductor 210, but does not actually adhere as a coating would. The insulating jacket 215 may be made of a plastic material or some other electrically insulating material, in accordance with various embodiments of the present invention.

The cable assembly 200 also includes a plurality of peripheral electrical conductors 220 surrounding the insulated central electrical conductor 210, 215 and running the length of the cable assembly 200. In accordance with an embodiment of the present invention, each of the plurality of peripheral electrical conductors 220 is substantially cylindrical in shape, having a substantially circular cross-sectional area. The plurality of peripheral electrical conductors 220 are positioned or wrapped around the insulated central electrical conductor 210. As an example, the cross-sectional area of each of the peripheral electrical conductors 220 may be approximately 0.008 square inches (when the diameter is about 80 thousandths of an inch). The peripheral electrical conductors 220 may be made of any number of different types of conductive electrical materials such as, for example, copper. Alternatively, the cross-section of each of the peripheral electrical conductors may be in the form of other shapes as well such as, for example, a triangular shape.

In the embodiment of FIG. 2, the peripheral electrical conductors 220 are not individually electrically insulated. The central electrical conductor 210 is electrically insulated from the plurality of peripheral electrical conductors 220 only by the first electrically insulating jacket 215. The coaxial cable assembly 200 is capable of being electrically connected between a welding power source and a welding wire feeder and a work-piece to be welded. Such connections may be accomplished via electrical connectors attached to the ends of the cable assembly 200. The electrical connectors are attached to the cable assembly 200 such that the central electrical conductor 210 remains electrically insulated from the peripheral electrical conductors 220.

The central electrical conductor 210 may be used as (i.e., serve as) an electrode lead in a welding procedure and the plurality of peripheral electrical conductors 220 may be used as a work lead in a welding procedure. Alternatively, the central electrical conductor 210 may be used as (i.e., serve as) a work lead and the plurality of peripheral electrical conductors 220 may be used as an electrode lead.

In accordance with an embodiment of the present invention, the sum of the cross-sectional areas of the peripheral electrical conductors 220 is approximately equal to the cross-sectional area of the central electrical conductor 210. Such a configuration helps to maintain a uniform resistance path through the cable assembly 200, which is desirable. Based on the cross-sectional areas in the examples above, approximately 25 peripheral electrical conductors 220 would be positioned around the central electrical conductor 210 to make the cross-sectional areas equal.

The cable assembly 200 also has a second electrically insulating jacket 230 surrounding the plurality of peripheral electrical conductors 220 along the length of the cable assembly 200 to contain the insulated central electrical conductor 210, 215 and the plurality of un-insulated peripheral electrical conductors 220. The insulating jacket 230 may be made of a plastic material or some other electrically insulating material, in accordance with various embodiments of the present invention.

In the configuration of FIG. 2, the central conductor 210 is insulated from the plurality of peripheral conductors 220 and the entire assembly is insulated from the outside world by insulating jacket 230, without having to individually insulate each peripheral conductor 220 as in the prior art configuration of FIG. 1. As a result, the coaxial cable assembly 200 of FIG. 2 weighs substantially less and is more flexible than the cable assembly 100 of FIG. 1, since less insulating material is used in the configuration of FIG. 2.

Figure 3:
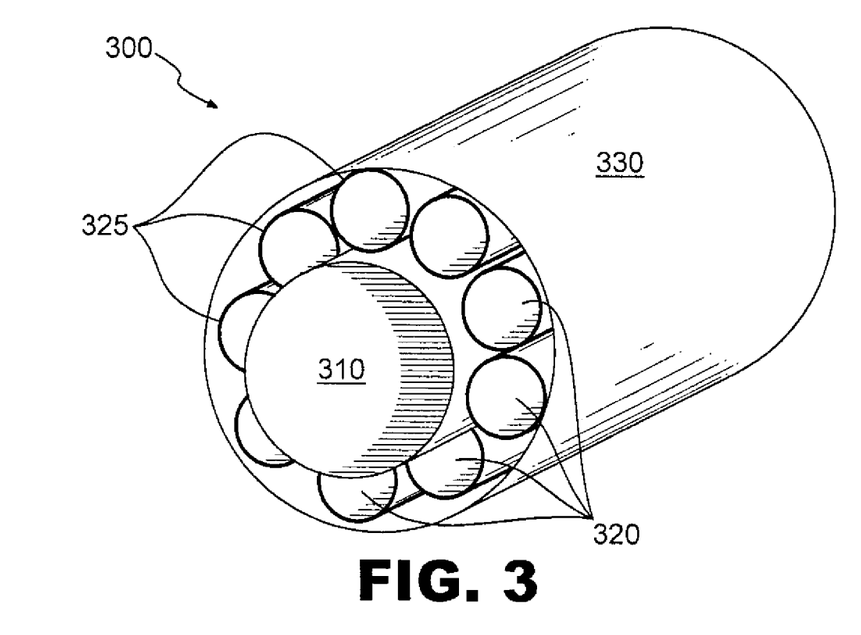
FIG. 3 is an exemplary illustration of a second embodiment of a coaxial welding cable assembly, in accordance with various aspects of the present invention.

FIG. 3 is an exemplary illustration of a second embodiment of a coaxial welding cable assembly 300, in accordance with various aspects of the present invention. The cable assembly 300 has a central electrical conductor 310, having a first pre-defined cross-sectional area which is relatively uniform, running the length of the cable assembly 300. In accordance with an embodiment of the present invention, the central electrical conductor 310 is substantially cylindrical in shape, having a substantially circular cross-sectional area. As an example, the cross-sectional area of the central electrical conductor 310 may be approximately 0.2 square inches (when the diameter is about 0.5 inches). The central electrical conductor 310 may be made of any number of different types of conductive electrical materials such as, for example, copper. Alternatively, the cross-section of the central electrical conductor 310 may be in the form of other shapes as well such as, for example, a rectangular shape.

Unlike the cable assembly 200 of FIG. 2, the cable assembly 300 does not have a first electrically insulating jacket surrounding the central electrical conductor 310. The cable assembly 300 also includes a plurality of peripheral electrical conductors 320 surrounding the central electrical conductor 310 and running the length of the cable assembly 300. Each of the plurality of peripheral electrical conductors 320 are electrically insulated with an insulating jacket 325. Each of the insulating jackets 325 surrounds a corresponding peripheral electrical conductor. Each insulating jacket 325 covers the outer surface of a corresponding peripheral electrical conductor 320 along the length of the corresponding peripheral electrical conductor 320. In accordance with an embodiment of the present invention, the insulating jackets 325 may be applied to the peripheral electrical conductors 320 such that the insulating jackets 325 adhere to the peripheral electrical conductors 320. For example, the insulating jackets 325 may be a coating that is applied to the peripheral electrical conductors 320. Alternatively, the insulating jackets 325 may be sleeves that slide over each corresponding peripheral electrical conductor 320, but does not actually adhere as a coating would. The insulating jackets 325 may be made of a plastic material or some other electrically insulating material, in accordance with various embodiments of the present invention.

In accordance with an embodiment of the present invention, each of the plurality of peripheral electrical conductors 320 is substantially cylindrical in shape, having a substantially circular cross-sectional area. The plurality of insulated peripheral electrical conductors 320 are positioned or wrapped around the un-insulated central electrical conductor 310. As an example, the cross-sectional area of each of the peripheral electrical conductors 320 may be approximately 0.008 square inches (when the diameter is about 80 thousandths of an inch). The peripheral electrical conductors 320 may be made of any number of different types of conductive electrical materials such as, for example, copper. Alternatively, the cross-section of each of the peripheral electrical conductors may be in the form of other shapes as well such as, for example, a triangular shape.

In the embodiment of FIG. 3, the central electrical conductor 310 is not electrically insulated. Each of the peripheral electrical conductors 320 are electrically insulated from the central electrical conductor 310 only by the insulating jackets 325. The coaxial cable assembly 300 is capable of being electrically connected between a welding power source and a welding wire feeder and a work-piece to be welded. Such connections may be accomplished via electrical connectors attached to the ends of the cable assembly 300. The electrical connectors are attached to the cable assembly 300 such that the central electrical conductor 310 remains electrically insulated from the peripheral electrical conductors 320.

The central electrical conductor 310 may be used as an electrode lead in a welding procedure and the plurality of peripheral electrical conductors 320 may be used as a work lead in a welding procedure. Alternatively, the central electrical conductor 310 may be used as a work lead and the plurality of peripheral electrical conductors 320 may be used as an electrode lead.

In accordance with an embodiment of the present invention, the sum of the cross-sectional areas of the peripheral electrical conductors 320 is approximately equal to the cross-sectional area of the central electrical conductor 310. Such a configuration helps to maintain a uniform resistance path through the cable assembly 300, which is desirable. Based on the cross-sectional areas in the examples above, approximately 25 peripheral electrical conductors 320 would be positioned around the central electrical conductor 310 to make the cross-sectional areas equal.

The cable assembly 300 also has a second electrically insulating jacket 330 surrounding the plurality of insulated peripheral electrical conductors 320, 325 along the length of the cable assembly 300 to contain the un-insulated central electrical conductor 310 and the plurality of insulated peripheral electrical conductors 320, 325. The insulating jacket 330 may be made of a plastic material or some other electrically insulating material, in accordance with various embodiments of the present invention.

In the configuration of FIG. 3, the central conductor 310 is insulated from the plurality of peripheral conductors 320 by the insulating jackets 325, and the entire assembly is insulated from the outside world by insulating jacket 330, without having to individually insulate the central electrical conductor 310 as in the prior art configuration of FIG. 1. As a result, the coaxial cable assembly 300 of FIG. 3 weighs substantially less and is more flexible than the cable assembly 100 of FIG. 1, since less insulating material is used in the configuration of FIG. 3.

Figure 4:
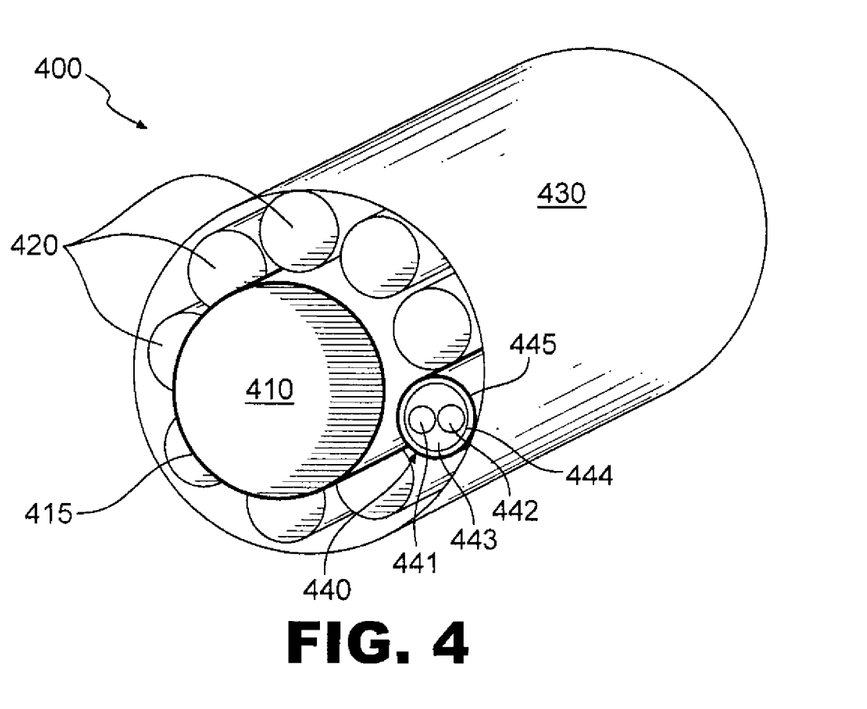
FIG. 4 is an exemplary illustration of a third embodiment of a coaxial welding cable assembly, in accordance with various aspects of the present invention.

FIG. 4 is an exemplary illustration of a third embodiment of a coaxial welding cable assembly 400, in accordance with various aspects of the present invention. The cable assembly 400 of FIG. 4 is very similar to the cable assembly 200 of FIG. 2, having a central electrical conductor 410 with an insulating jacket 415, a plurality of un-insulated peripheral electrical conductors 420 surrounding the insulated central electrical conductor 410, 415, and an insulating jacket 430 containing the plurality of peripheral electrical conductors 420 and the insulated central electrical conductor 410, 415. However, the cable assembly 400 also includes a conductor lead assembly 440 having a pair of conductor leads 441, 442 serving as sense leads or communication leads, and running the length of the cable assembly 400.

The conductor lead assembly 440 is located within the cable assembly 400 as part of the grouping of the peripheral electrical conductors 420 around the central electrical conductor 410. The pair of conductor leads 441, 442 are electrically insulated from each other by an insulating material 443 of the conductor lead assembly 440 which separates the conductor leads 441, 442. A conductive electrical shield 444 surrounds the pair of conductor leads 441, 442 and is electrically insulated from the pair of conductor leads 441, 442 also by the insulating material 443. In addition, the shield 444 is electrically insulated from the peripheral electrical conductors 420 by an insulating jacket 445 of the conductor lead assembly 440. The conductive shield 444 prevents electrical interference, which may be generated from the other conductors 410, 420 or other external sources, from reaching the pair of conductor leads 441, 442. As a result, signals being transmitted over the pair of conductor leads 441, 442 will not be corrupted by outside electrical interference since the conductor leads 441, 442 are electrically shielded.

In accordance with an embodiment of the present invention, the conductor leads 441, 442 act as sense leads for sensing (i.e., measuring) a voltage or a current of an arc formed between an electrode and a work-piece during a welding procedure. Sense leads typically connect at one end to a specially designated sensor on a welding power supply. At the other end, the negative voltage sense lead (e.g., 441) is typically clamped or clipped onto the work-piece or workbench, and the positive voltage sense lead (e.g., 442) is typically connected to the wire feed motor.

In accordance with an alternative embodiment of the present invention, the conductor leads 441, 442 act as communication leads to transmit control or command signals between, for example, a power source and a wire feeder.

In accordance with a further alternative embodiment of the present invention, such a conductor lead assembly 440 may be integrated into the cable assembly configuration 300 of FIG. 3 and serve as sense leads or communication leads.

In accordance with another alternative embodiment of the present invention, the conductor lead assembly 440 may include only one conductor lead (e.g., 441). In accordance with a further alternative embodiment of the present invention, the conductor lead assembly 440 may include more than two conductor leads, depending on the exact applications of sensing and/or communication.

Figure 5:
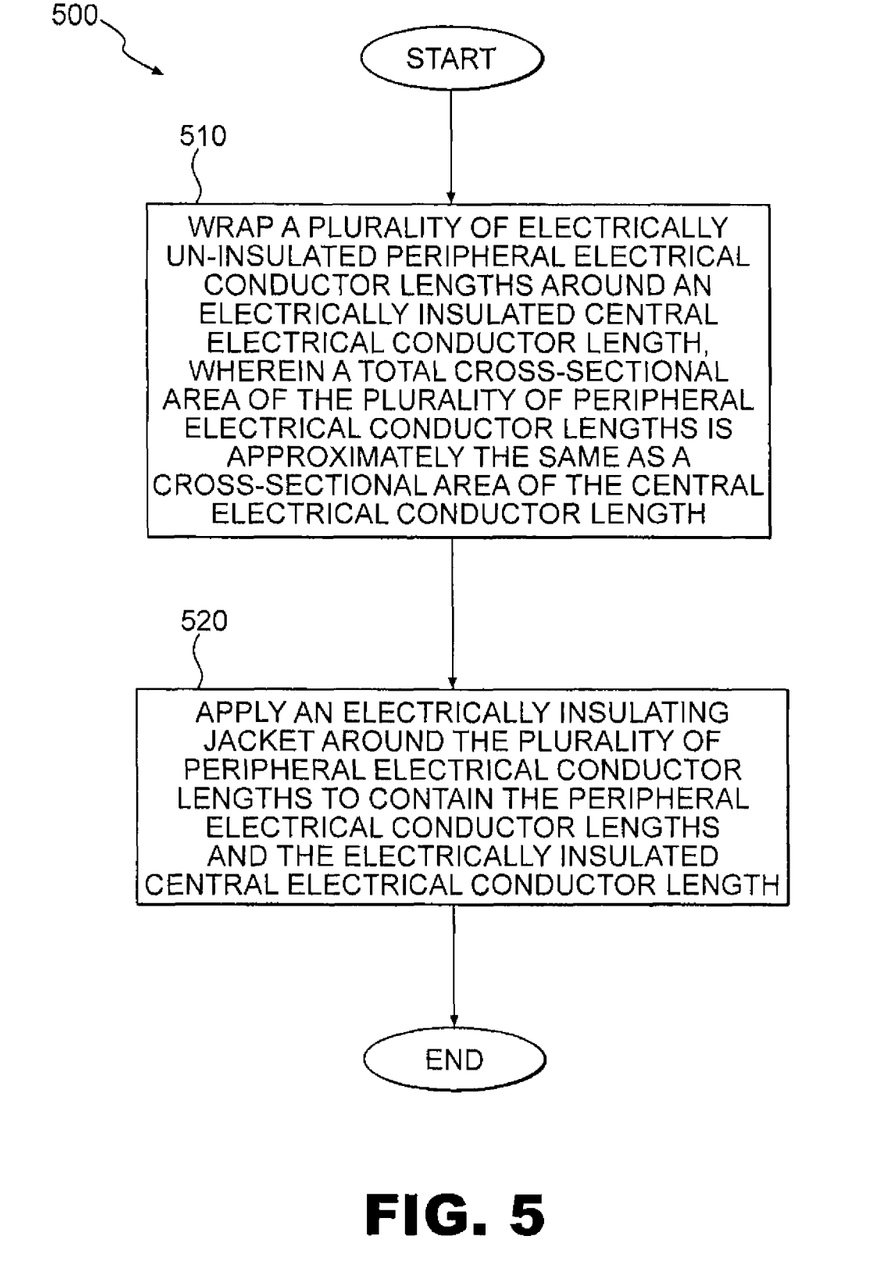
FIG. 5 is a flowchart of an embodiment of a method for constructing the coaxial welding cable assembly of FIG. 2, in accordance with various aspects of the present invention.

FIG. 5 is a flowchart of an embodiment of a method 500 for constructing the coaxial welding cable assembly 200 of FIG. 2, in accordance with various aspects of the present invention. In step 510, a plurality of electrically un-insulated peripheral electrical conductor lengths are wrapped around an electrically insulated central electrical conductor length, wherein a total cross-sectional area of the plurality of peripheral electrical conductor lengths is approximately the same as a cross-sectional area of the central electrical conductor length. In step 520, an electrically insulating jacket is applied around the plurality of peripheral electrical conductor lengths to contain the peripheral electrical conductor lengths and the electrically insulated central electrical conductor length.

In accordance with an embodiment of the present invention, a system for performing the method 500 of FIG. 5 comprises a means for wrapping a plurality of electrically un-insulated peripheral conductor lengths around an electrically insulated central conductor length, wherein a total cross-sectional area of the plurality of peripheral electrical conductor lengths is approximately the same as a cross-sectional area of the central electrical conductor length, and a means for applying an electrically insulating jacket around the plurality of peripheral electrical conductor lengths to contain the peripheral conductor lengths and the electrically insulated central electrical conductor length.

Figure 7:
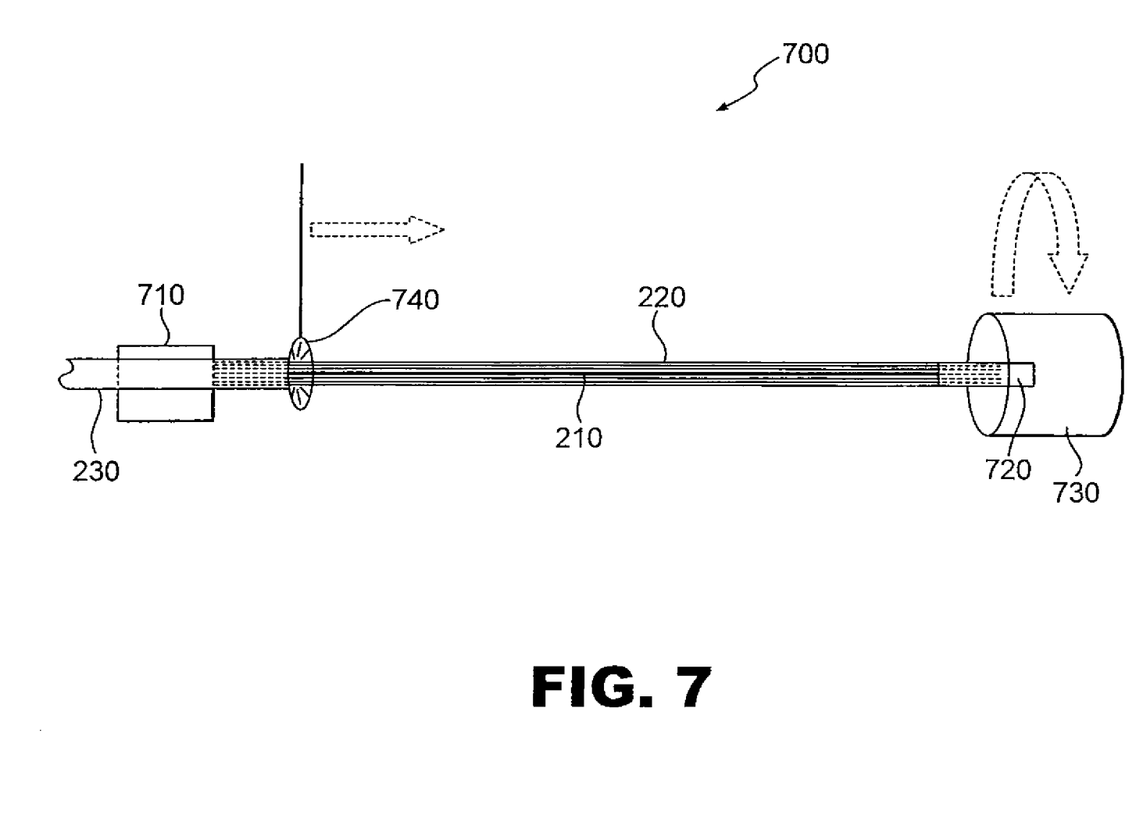
FIG. 7 is an exemplary illustration of an embodiment of a system for constructing a coaxial cable assembly, in accordance with various aspects of the present invention.

As an example, the means for wrapping a plurality of electrically un-insulated peripheral conductor lengths around an electrically insulated central conductor length includes a robotic system 700 having a first clamp 710 capable of holding a first end of a central electrical conductor length 210 in place and a first set of ends of a plurality of peripheral electrical conductors 220 in place, a second clamp 720 capable of holding a second end of the central electrical conductor 210 in place, and a rotatable clamp 730 to hold the second set of ends of the plurality of peripheral electrical conductors 220 and to rotate such that the plurality of peripheral electrical conductors 220 wrap or wind around the central electrical conductor 210. Similarly, a conductor lead assembly 440 may be included with the plurality of peripheral electrical conductor lengths 220 to be wrapped around the central electrical conductor 210 at the same time.

Continuing with the example, the means for applying an electrically insulating jacket around the plurality of peripheral electrical conductor lengths includes a sliding clamp 740 capable of clamping to a first end of an insulating jacket 230 and sliding along the length of the central conductor 210 and peripheral conductors 220 to apply the insulating jacket 230 over the conductors 210, 220.

Figure 6:
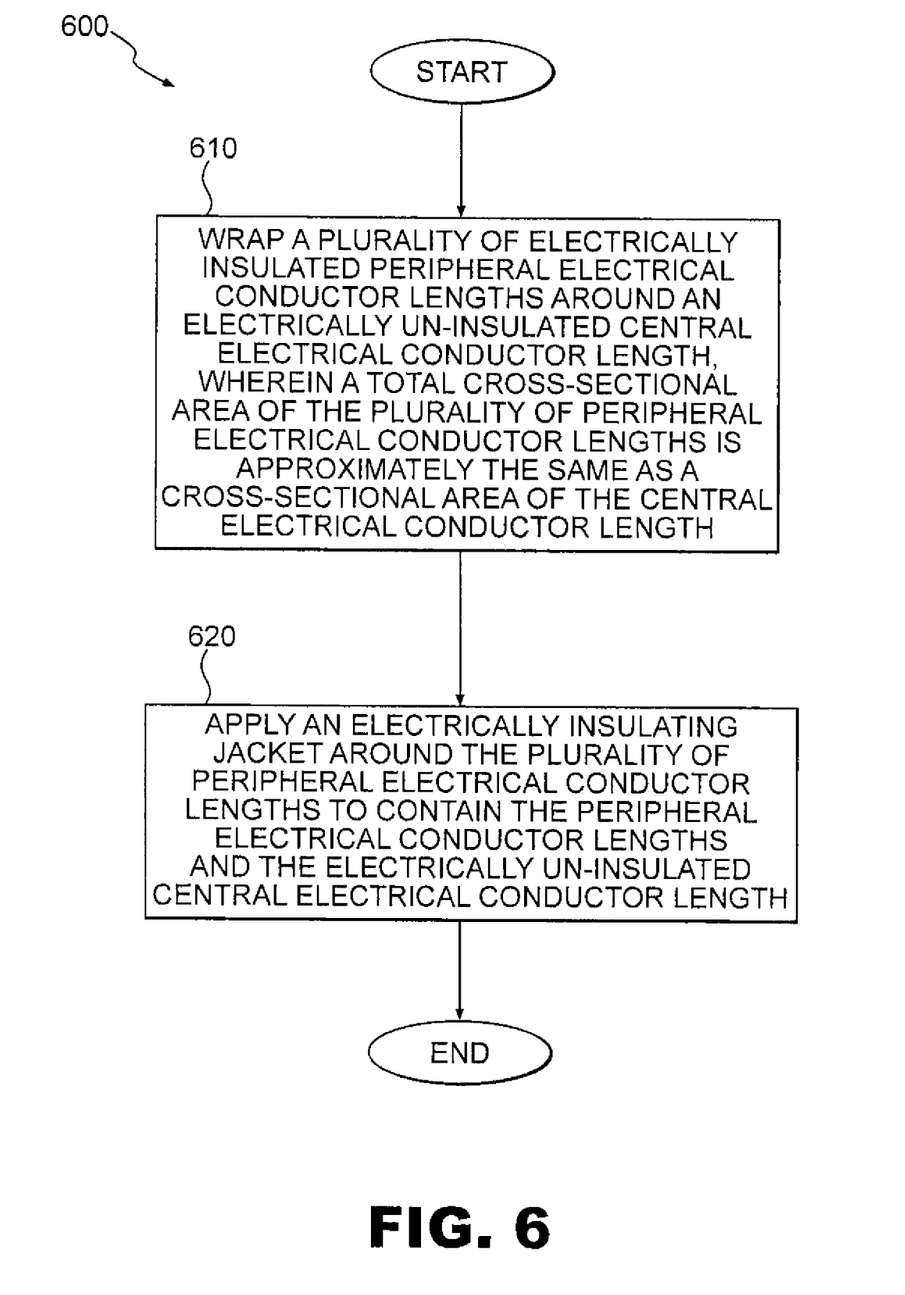
FIG. 6 is a flowchart of an embodiment of a method for constructing the coaxial welding cable assembly of FIG. 3, in accordance with various aspects of the present invention.

FIG. 6 is a flowchart of an embodiment of a method 600 for constructing the coaxial welding cable assembly 300 of FIG. 3, in accordance with various aspects of the present invention. In step 610, a plurality of electrically insulated peripheral electrical conductor lengths are wrapped around an electrically un-insulated central electrical conductor length, wherein a total cross-sectional area of the plurality of peripheral electrical conductor lengths is approximately the same as a cross-sectional area of the central electrical conductor length. In step 620, an electrically insulating jacket is applied around the plurality of peripheral electrical conductor lengths to contain the peripheral electrical conductor lengths and the electrically un-insulated central electrical conductor length.

In accordance with an embodiment of the present invention, a system for performing the method 600 of FIG. 6 comprises a means for wrapping a plurality of electrically insulated peripheral conductor lengths around an electrically un-insulated central conductor length, wherein a total cross-sectional area of the plurality of peripheral electrical conductor lengths is approximately the same as a cross-sectional area of the central electrical conductor length, and a means for applying an electrically insulating jacket around the plurality of peripheral electrical conductor lengths to contain the peripheral conductor lengths and the electrically un-insulated central electrical conductor length. The robotic system 700 of FIG. 7, or similar system, may be used to perform the method 600 of FIG. 6, in accordance with an embodiment of the present invention.

In summary, coaxial cable assemblies for welding applications, and methods and systems for constructing same assemblies, are disclosed. The cable assemblies reduce the amount of insulating material used within the cable assemblies, thereby making the cable assemblies lighter in weight and more flexible, and providing a relatively uniform resistance path through the cable.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A coaxial cable assembly, said cable assembly comprising:
    a central electrical conductor core;
    a first electrically insulating jacket surrounding said central electrical conductor core;
    a plurality of peripheral electrical conductors surrounding said insulated central electrical conductor core, wherein said central electrical conductor core is electrically insulated from said plurality of peripheral electrical conductors only by said first electrically insulating jacket, and wherein a substantially uniform electrical resistance path is maintained through said coaxial cable assembly via conductive electrical materials and cross-sectional areas of said central electrical conductor core, and conductive electrical materials and the sum of cross-sectional areas of said plurality of peripheral electrical conductors; and
    a second electrically insulating jacket surrounding said plurality of peripheral electrical conductors to contain said insulated central electrical conductor core and said plurality of peripheral electrical conductors.

2. The coaxial cable assembly of claim 1 wherein said cable assembly is capable of being electrically connected between a welding power source and a welding wire feeder and a work-piece to be welded.

3. The coaxial cable assembly of claim 1 wherein a cross-sectional area of each of said plurality of peripheral electrical conductors is approximately the same.

4. The coaxial cable assembly of claim 1 wherein said central electrical conductor core serves as an electrode lead between a welding power source and a welding wire feeder.

5. The coaxial cable assembly of claim 1 wherein said plurality of peripheral electrical conductors serve as a work lead between a welding power source and a work-piece to be welded.

6. The coaxial cable assembly of claim 1 further comprising at least one electrically shielded sense lead for measuring a voltage at a work-piece to be welded and/or at a welding wire feeder.

7. The coaxial cable assembly of claim 1 further comprising at least one electrically shielded communication lead for communicating at least one signal between a welding wire feeder and a welding power source.

8. A coaxial cable assembly, said cable assembly comprising:
    an un-insulated central electrical conductor core;
    a plurality of peripheral electrical conductors surrounding said un-insulated central electrical conductor core, and wherein a substantially uniform electrical resistance path is maintained through said coaxial cable assembly via conductive electrical materials and cross-sectional areas of said un-insulated central electrical conductor core, and conductive electrical materials and the sum of cross-sectional areas of said plurality of peripheral electrical conductors;
    a plurality of first electrically insulating jackets wherein each one of said plurality of first electrically insulating jackets surrounds a corresponding one of said plurality of peripheral electrical conductors, and wherein said un-insulated central electrical conductor core is electrically insulated from said plurality of peripheral electrical conductors only by said plurality of first electrically insulating jackets; and
    a second electrically insulating jacket surrounding said plurality of insulated peripheral electrical conductors to contain said un-insulated central electrical conductor core and said plurality of insulated peripheral electrical conductors.

9. The coaxial cable assembly of claim 8 wherein said cable assembly is capable of being electrically connected between a welding power source and a welding wire feeder and a work-piece to be welded.

10. The coaxial cable assembly of claim 8 wherein a cross-sectional area of each of said plurality of peripheral electrical conductors is approximately the same.

11. The coaxial cable assembly of claim 8 wherein said un-insulated central electrical conductor core serves as an electrode lead between a welding power source and a welding wire feeder.

12. The coaxial cable assembly of claim 8 wherein said plurality of peripheral electrical conductors serve as a work lead between a welding power source and a work-piece to be welded.

13. The coaxial cable assembly of claim 8 further comprising at least one electrically shielded sense lead for measuring a voltage at a work-piece to be welded and/or at a welding wire feeder.

14. The coaxial cable assembly of claim 8 further comprising at least one electrically shielded communication lead for communicating at least one signal between a welding wire feeder and a welding power source.

15. A system for constructing a coaxial cable assembly, said system comprising:
- a means for wrapping a plurality of electrically un-insulated peripheral electrical conductors around an electrically insulated central electrical conductor core, wherein a substantially uniform electrical resistance path is maintained through said coaxial cable assembly via conductive electrical materials and cross-sectional areas of said electrically insulated central electrical conductor core, and conductive electrical materials and the sum of cross-sectional areas of said plurality of electrically un-insulated peripheral electrical conductors; and
- a means for applying an electrically insulating jacket around said plurality of electrically un-insulated peripheral electrical conductors to contain said electrically un-insulated peripheral electrical conductors and said electrically insulated central electrical conductor core.

16. The system of claim 15 further comprising a means for wrapping at least one electrically shielded sense lead, for measuring a voltage at a work-piece to be welded and/or at a welding wire feeder, around said electrically insulated central electrical conductor core.

17. The system of claim 15 further comprising a means for wrapping at least one electrically shielded communication lead, for communicating at least one signal between a welding wire feeder and a welding power source, around said electrically insulated central electrical conductor core.

18. The system of claim 15 further comprising a means for attaching electrical connectors to both ends of said coaxial cable assembly such that said electrically insulated central electrical conductor core remains electrically insulated from said electrically un-insulated peripheral electrical conductors and such that said coaxial cable assembly is capable of being electrically connected between a welding power source and a welding wire feeder and a work-piece to be welded.

* * * * *